United States Patent
Azad et al.

(10) Patent No.: US 10,255,572 B2
(45) Date of Patent: Apr. 9, 2019

(54) INTEGRATION OF CLOTHING PERFORMANCE IN PLANNING OPTIMIZATION OF PAPER AND BOARD MACHINE TO REDUCE MANUFACTURING COSTS

(71) Applicants: Chandra Azad, Bangalore (IN); Balamurugan Ramakrishnan, Bangalore (IN); Lingathurai Palanisamy, Bangalore (IN); Niranjan Rao, Bangalore (IN); Gajanan Rothe, Bangalore (IN)

(72) Inventors: Chandra Azad, Bangalore (IN); Balamurugan Ramakrishnan, Bangalore (IN); Lingathurai Palanisamy, Bangalore (IN); Niranjan Rao, Bangalore (IN); Gajanan Rothe, Bangalore (IN)

(73) Assignee: Honeywell ASCa Inc., Mississauga (CA)

( * ) Notice: Subject to any disclaimer, the term of this patent is extended or adjusted under 35 U.S.C. 154(b) by 816 days.

(21) Appl. No.: 14/795,623

(22) Filed: Jul. 9, 2015

(65) Prior Publication Data
US 2017/0011317 A1  Jan. 12, 2017

(51) Int. Cl.
G06Q 10/06 (2012.01)
D21G 9/00 (2006.01)
G06Q 10/00 (2012.01)

(52) U.S. Cl.
CPC ..... *G06Q 10/06313* (2013.01); *D21G 9/0009* (2013.01); *D21G 9/0027* (2013.01); *D21G 9/0036* (2013.01); *G06Q 10/20* (2013.01)

(58) Field of Classification Search
CPC .. D21G 9/0009; D21G 9/0027; D21G 9/0036; G06Q 10/06313; G06Q 10/087;

(Continued)

(56) References Cited

U.S. PATENT DOCUMENTS 3,886,036 A * 5/1975 Dahlin ................. D21G 9/0027
162/198
4,633,596 A * 1/1987 Josef ..................... D21F 1/0027
139/383 A (Continued)

FOREIGN PATENT DOCUMENTS

EP  1329551 A2  7/2003
EP  1342839 B1  11/2006

(Continued)

OTHER PUBLICATIONS

Summary of Non-Patent Literature Searched for 14795623.*
European Patent Application No. EP16177309.8, European Search Report dated Nov. 16, 2016.

*Primary Examiner* — Tyler W Knox
(74) *Attorney, Agent, or Firm* — Charles H Jew

(57) ABSTRACT

Integration of clothing performance into production planning, scheduling and execution of papermaking machines yields paper products with consistent acceptable quality with minimum downtime and inventory. Linking the selection and operation of papermaking machines to their respective clothing performances improves clothing life cycle. Selected operating parameters of a papermaking machine and historical clothing data are indicative of the machine's clothing condition. Order scheduling engine identifies manufacturing times for particular grades of product and generates order blocks. Papermaking machines are assigned to execute specific order blocks with provision that each machine completes execution of the assigned orders without any anticipated breakage of the wire or felts.

16 Claims, 2 Drawing Sheets

(58) Field of Classification Search
CPC .......... G05B 2219/36361; G05B 2219/36295; G05B 2219/37252; G05B 2219/50185; G05B 19/4065; B23Q 17/008; B23Q 17/0995; B41J 17/02
See application file for complete search history.

(56) References Cited

U.S. PATENT DOCUMENTS

| | | | | | |
|---|---|---|---|---|---|
| 5,358,606 | A | * | 10/1994 | Makkonen | D21G 9/0009 162/198 |
| 5,894,867 | A | * | 4/1999 | Ward | D21F 1/0027 139/383 A |
| 6,076,022 | A | * | 6/2000 | Hagart-Alexander | D21G 9/0027 700/122 |
| 6,086,716 | A | * | 7/2000 | Watson | D21D 1/002 162/198 |
| 6,322,666 | B1 | * | 11/2001 | Luontama | D21F 1/02 162/198 |
| 6,490,569 | B1 | * | 12/2002 | Grune | G06Q 10/00 705/28 |
| 6,853,951 | B2 | * | 2/2005 | Jarrell | G05B 23/0283 702/181 |
| 7,811,417 | B2 | * | 10/2010 | MacHattie | D21F 7/003 162/263 |
| 7,933,793 | B2 | * | 4/2011 | Jordan | G06Q 10/04 705/7.13 |
| 2002/0079076 | A1 | * | 6/2002 | Bricco | D21F 1/20 162/203 |
| 2003/0004765 | A1 | * | 1/2003 | Wiegand | G06Q 10/06 702/184 |
| 2003/0164228 | A1 | * | 9/2003 | Munch | D21F 1/32 162/199 |
| 2004/0003861 | A1 | * | 1/2004 | Best | D21F 1/0027 139/383 A |
| 2004/0140077 | A1 | * | 7/2004 | Bricco | D21F 1/20 162/209 |
| 2004/0151871 | A1 | * | 8/2004 | Telgmann | B32B 5/08 428/107 |
| 2005/0075968 | A1 | * | 4/2005 | Apostolides | G06Q 10/06 705/38 |
| 2005/0145043 | A1 | * | 7/2005 | Ischdonat | G01N 15/0826 73/38 |
| 2006/0162887 | A1 | * | 7/2006 | Weinstein | D21F 3/02 162/198 |
| 2006/0282343 | A1 | * | 12/2006 | Palanisamy | G06Q 10/00 705/28 |
| 2007/0124009 | A1 | * | 5/2007 | Bradley | G06Q 10/06 700/99 |
| 2007/0169060 | A1 | * | 7/2007 | Boek | D21F 1/0027 717/160 |
| 2007/0239368 | A1 | * | 10/2007 | Marrano | G06Q 10/06 702/34 |
| 2008/0087397 | A1 | * | 4/2008 | Baker | D21F 1/32 162/199 |
| 2009/0032206 | A1 | * | 2/2009 | Gregory | D21C 5/005 162/5 |
| 2009/0095432 | A1 | * | 4/2009 | MacHattie | D21F 7/003 162/198 |
| 2009/0194245 | A1 | * | 8/2009 | Pilsbury | D21F 1/0027 162/207 |
| 2010/0241481 | A1 | * | 9/2010 | Apostolides | G06Q 10/06 705/7.41 |
| 2010/0300683 | A1 | * | 12/2010 | Looper | E21B 21/06 166/250.01 |
| 2012/0217667 | A1 | * | 8/2012 | Kallweit | B29B 17/02 264/37.28 |
| 2013/0290239 | A1 | * | 10/2013 | Vaquero | G06N 5/025 706/47 |
| 2014/0075004 | A1 | * | 3/2014 | Van Dusen | H04L 41/04 709/223 |
| 2014/0330749 | A1 | * | 11/2014 | Candas | G06Q 40/06 705/36 R |
| 2015/0185111 | A1 | * | 7/2015 | Armstrong | G01M 15/14 702/34 |
| 2016/0363497 | A1 | * | 12/2016 | Figiel | G01L 5/0085 |

FOREIGN PATENT DOCUMENTS

EP          2198278 B1    12/2014
WO    2005113893 A1    12/2005

* cited by examiner

INTEGRATION OF CLOTHING PERFORMANCE IN PLANNING OPTIMIZATION OF PAPER AND BOARD MACHINE TO REDUCE MANUFACTURING COSTS

FIELD OF THE INVENTION

The present invention relates generally to the manufacturing of paper and board products and in particular to novel techniques of evaluating the condition of machine clothing and the integration of clothing performance into the production planning and execution of customer orders for such products.

BACKGROUND OF THE INVENTION

In the manufacture of paper on continuous papermaking machines, a web of paper is formed from an aqueous suspension of fibers on a traveling mesh wire or fabric and water drains by gravity and vacuum suction through the fabric. The web is then transferred to the pressing section where more water is removed by dry felt and pressure. The web next enters the dryer section where steam heated dryers and hot air completes the drying process. The wire or fabric and felt are commonly referred to as papermaking clothing which is conditioned (or cleaned) periodically and replaced as required. Substandard clothing leads to poor web formation on the machine which ultimately results in lower quality paper products exhibiting streaks, pinholes and poor mechanical and optical properties.

Techniques for regulating papermaking by monitoring the condition of the felt and/or affecting the moisture level of the felt are known. For example, EP 2198278 describes infrared measurement of the paper machine clothing condition to control paper production. U.S. Pat. No. 7,811,417 describes a cross-direction actuator system for maintaining the moisture level on press felt in order to affect the moisture content in the sheet of paper produced. EP 1342839 describes measuring the hardness or compactness of clothing to determine its condition and performance. EP 1329551 describes monitoring the cross-direction dewatering profile in the wet section to determine when replacement of the felt was necessary.

The average felt life is approximately 40 to 45 days and the average wire life is approximately 90 to 100 days, with both being dependent on the type of paper machine and nature of raw material processed. To avoid interruptions and downtime caused by unexpected clothing breakage during production, papermakers often replace the felt and wire more frequently than is required. In addition, papermakers will change the grades of paper being produced in order to reduce the likelihood of breakage. For instance, a changeover from a lower basis weight paper to a higher basis weight paper can be implemented as the wire fabric becomes impregnated with fiber and debris. The basis weight is the paper's weight per area and is typically designated in the industry by grams per square meter (gsm). Unscheduled changeovers generate excess inventory of unplanned paper grades.

SUMMARY OF THE INVENTION

The present invention is based in part on the recognition that considering clothing performance as a strong input during production planning significantly improves the operations of individual papermaking machines. Integration of the clothing performance (ageing of machine clothing) reduces the frequency of clothing breakages and attendant shutdowns, maximizes the use of the clothing, and produces consistently better paper and paperboard products. Furthermore, papermaking machine operators will be able to deliver paper product orders on time, with less waste and at lower costs. With prior art practice, clothing performance was not considered during production planning and, as a result, the frequent unplanned shutdowns of the papermaking machines required re-planning of many orders which caused inevitable delays and related problems.

In one aspect, the invention is directed to a method of operating a papermaking machine with enhanced clothing life wherein a sheet of wet stock comprising fibers is initially formed on a water permeable moving wire of a forming section of a de-watering machine and thereafter a sheet of partially de-watered web stock is transferred to a press section of the de-watering machine, wherein the press section comprises at least one continuously circulating press felt, the method including the steps of:

(a) operating the machine to produce a selected quantity of first grade paper product;

(b) monitoring the condition of the wire and generating wire data;

(c) monitoring the conditions of the felt and generating felt data;

(d) calculating the remaining useful life of the wire;

(e) calculating the remaining useful life of the felt;

(f) operating the papermaking machine to produce a selected subsequent quantity of subsequent grade of paper product, wherein the subsequent grade of paper produced could be the same as the grade of previously made paper product, with the proviso that the amount of selected subsequent quantity of subsequent grade paper product produced does not cause the papermaking machine to exceed either the remaining useful life of the wire or the remaining useful life of the felt; and (g) repeating steps (b) through (f) until the useful life of either the wire or felt is reached with the provision that neither the wire nor felt breaks upon termination of operations of the papermaking machine.

The present invention allows for robust optimized production planning of customer orders that require manufacturing multiple grades of paper and/or paperboard products with different delivery schedules where the planner can select from a plurality of papermaking machines which are located at different mills to make the products and complete the orders. The papermaking machines include machines of various designs. The only limitation being that the machine is capable of producing one or more grades of paper product in the customer order. One embodiment of the invention comprises establishing a library containing the useful clothing life of the clothing for each of the papermaking machines for supported grades and basis weights.

In another aspect, the invention is directed to a method of manufacturing paper products that includes the steps of:

(a) monitoring the condition of the clothing on a plurality of papermaking machines and estimating the life of the clothing for each papermaking machine;

(b) obtaining customer orders for paper products;

(c) assigning one or more of the plurality of papermaking machines to produce the paper products with the objective of limiting costs;

(d) identifying the warehousing requirements for the paper products; and (e) identifying the delivery date for each customer order.

The present invention which links the selection and operation of one or more papermaking machines to their respective clothing performance will improve clothing life cycle. It is expected that the wire life and the felt life will both be raised to at least 90% of normal. Moreover, the paper products produced will have a consistently better quality resulting in fewer production rejections and excess inventory. Furthermore, with the attendant improved production and delivery times, there will be significantly reduced warehousing requirements.

DETAILED DESCRIPTION OF PREFERRED EMBODIMENTS

Figure 1:
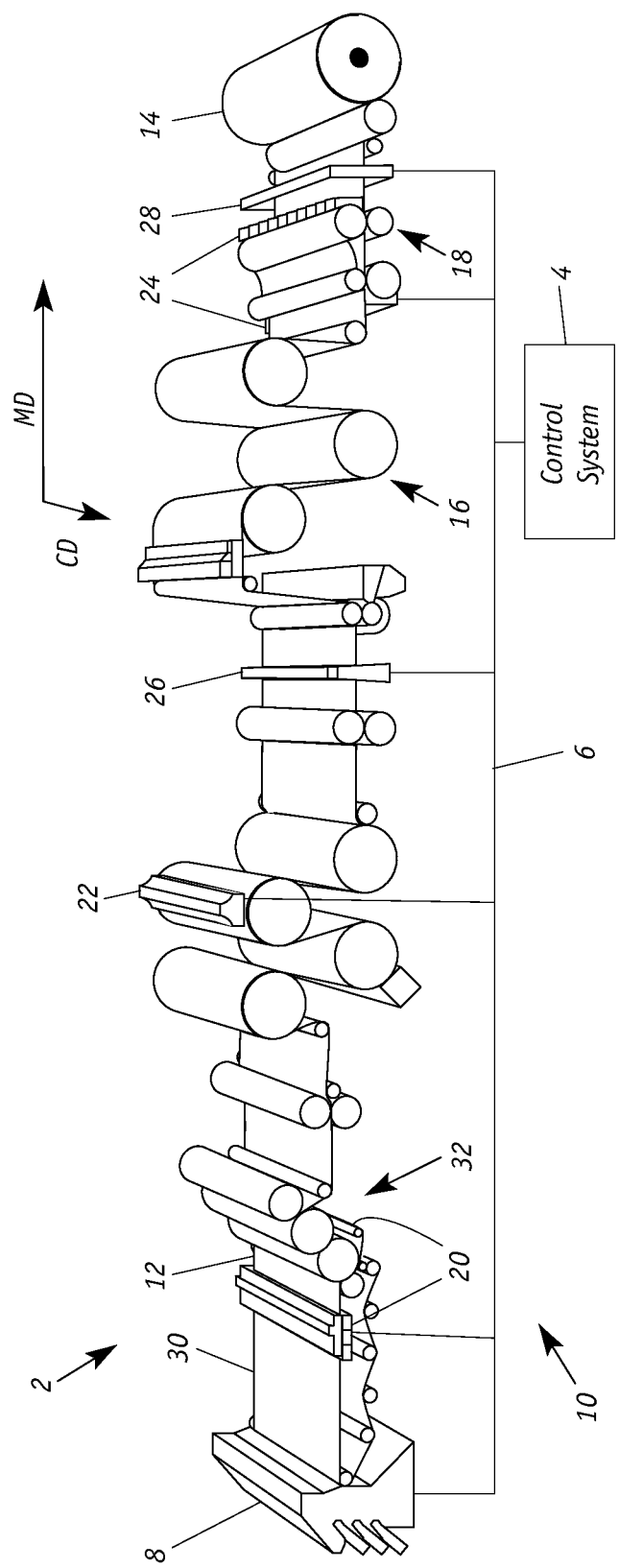
FIG. 1 depicts a papermaking machine.

The integration of clothing performance in dynamic planning optimization will be illustrated by implementing the technique in a sheet or web making system 10 that includes papermaking machine 2, control system 4 and network 6 as illustrated in FIG. 1. The papermaking machine 2 produces a continuous sheet or web of paper material 12 that is collected in take-up reel 14. The paper material 12, having a specific width, is produced from a pulp suspension, comprising of an aqueous mixture of wood fibers and other materials, which undergoes various unit operations that are monitored and controlled by control system 4. The network 6 facilitates communication between the components of system 10.

The papermaking machine 2 includes a headbox 8, which distributes a pulp suspension uniformly across the machine onto a continuous moving screen or wire 30 that moves in the machine direction (MD). The wire 30 is typically an open mesh material that can be made of metal such woven bronze or copper. Alternatively, the wire can be made of synthetic materials such as plastics (polyamides), in which case the wire is often referred to as a fabric. Headbox 8 includes any suitable structure for distributing a pulp suspension and includes a slice opening through which the pulp suspension is distributed onto moving screen or wire 30 which comprise a suitable structure such as a mesh for receiving a pulp suspension and allowing water or other materials to drain or leave the pulp suspension. The slice jet speed is the speed at which pulp stock exits the headbox. Besides the composition, consistency and temperature of the stock, the jet-to-wire speed ratio is another important operating variable. As used herein, the "wet end" forming portion of sheetmaking system 10 comprises headbox 8 and wire 30 and those sections before the wire 30, and the "dry end" comprises the sections that are downstream from wire 30.

Sheet 12 enters a press section 32, which includes multiple press rolls where sheet 12 travels through the openings (referred to as "nips") between pairs of counter-rotating rolls. In this way, the rolls in press section 32 compress the pulp material forming sheet 12. This may help to remove more water from the pulp material and to equalize the characteristics of the sheet 12 on both of its sides.

As sheet 12 travels over a series of heated rolls in dryer section 16, more water in sheet 12 is evaporated. A calendar 18 processes and finishes sheet 12, for example, by smoothing and imparting a final finish, thickness, gloss, or other characteristic to sheet 12. Other materials (such as starch or wax) can also be added to sheet 12 to obtain the desired finish. An array of induction heating actuators 24 applies heat along the cross direction (CD) to one or more of the rollers to control the roll diameters and thereby the size of the nips. Once processing by calendar 36 is complete, sheet 12 is collected onto reel 14.

Sheetmaking system 10 further includes an array of steam actuators 20 that controls the amount of hot steam that is projected along the CD. The hot steam increases the paper surface temperature and allows for easier cross directional removal of water from the paper sheet. Also, to reduce or prevent over drying of the paper sheet, paper material 14 is sprayed with water in the CD. Similarly, an array of rewet shower actuators 22 controls the amount of water that is applied along the CD.

In order to control the papermaking process, the properties of sheet 12 are continuously measured and the papermaking machine 2 adjusted to ensure sheet quality. This control may be achieved by measuring sheet properties using one or more scanners 26, 28 that are capable of scanning sheet 12 and measuring one or more characteristics of sheet 12. For example, scanner 28 could carry sensors for measuring the dry weight, moisture content, ash content, or any other or additional characteristics of sheet 12. Scanner 28 includes suitable structures for measuring or detecting one or more characteristics of sheet 12, such as a set or array of sensors. Scanner 28 can measure the dry end dry weight, ash content, or other physical properties of the paper product. Measurements from scanner 28 are provided to control system 4 that adjusts various operations of papermaking machine 2 that affect MD and/or CD characteristics of sheet 12. An MD characteristic of sheet 12 generally refers to an average characteristic of sheet 12 that varies and is controlled in the machine direction.

In this example, control system 4 is capable of controlling the dry weight of the paper sheet by adjusting the supply of pulp to the headbox 8. For example, control system 4 could provide information to a stock flow controller that regulates the flow of stock through valves and to headbox 8. Control system 4 includes any hardware, software, firmware, or combination thereof for controlling the operation of the sheetmaking machine 2 or other machine. Control system 4 could, for example, include a processor and memory storing instructions and data used, generated, and collected by the processor. Scanner measurements control operations of the papermaking machine with both the dry end control and wet end control loops operating.

Figure 2:
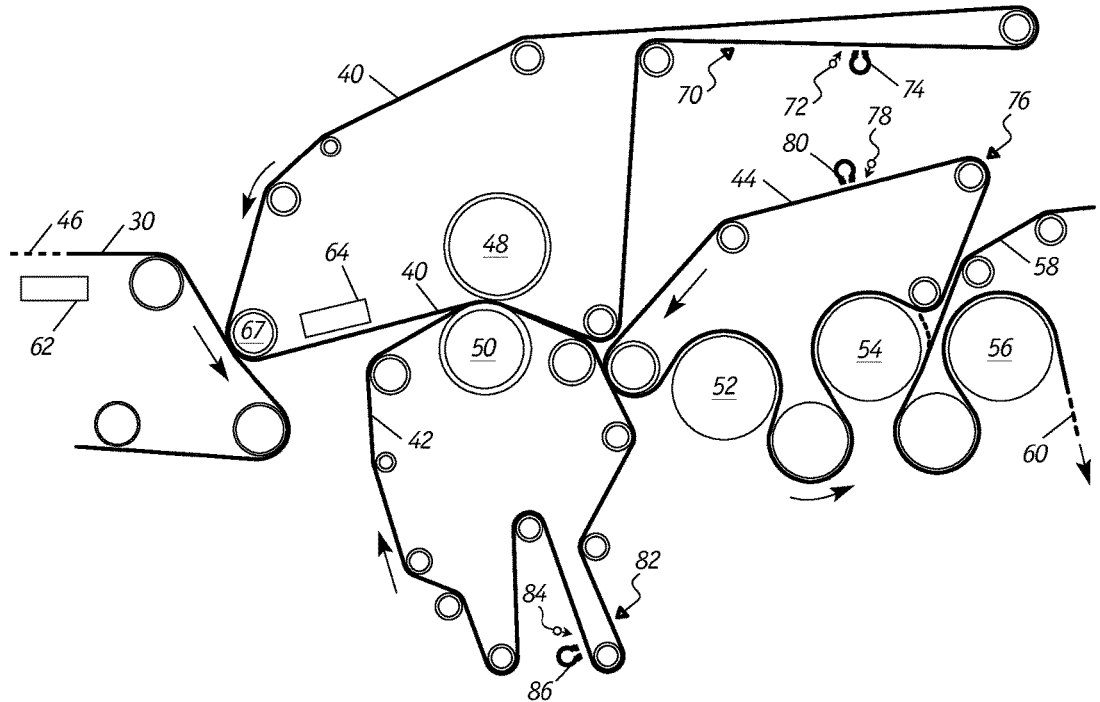
FIG. 2 illustrates the press arrangement of the papermaking machine.

FIG. 2 depicts a representative press section which is situated between the end of the forming section and beginning of the dryer section. The press section consists of a number of cooperating endless circulating loops, through which a sheet of wet stock is transformed into a sheet of partially de-watered wet-stock. This exemplary press arrangement includes three separate closed loops that include: (1) upper press felt 40, (2) lower press felt 42, and (3) dryer felt 44. Press felts 40, 42 serve as reservoirs to collect (absorb) water from the sheet of wet stock by pressing and capillary action. The forming wires, press felts, and dryer felts are collectively referred to as papermaking clothing. Dryer felt 44 is heated and water evaporates from the partially de-water wet stock as it is carried by the dryer felt. Upper and lower press felt 40, 42 are typically made of synthetic materials whereas dryer felt 44 is typically made of cotton or synthetic materials. The structure of the felts used in the dryer section can have very high open areas to afford rapid evaporation. Coarse or grainy characteristics, chocking of felts, sticky materials on the felts, degraded porosity and excessive hardness on the press and dryer felts can cause marks or imperfections on the paper formed.

A sheet of aqueous wet stock 46 is transported from wire 30 of the forming section onto the wet-press section. Vacuum devices 62, 64 referred to as Uhle boxes (vacuum boxes) under the wire and press felt remove water from the web. A sheet of wet stock 46 is transferred by suction to the bottom side of upper press felt 40 that is held by suction roll 62 and is thereafter retained and supported by surface tension on the upper press felt 40 as the sheet becomes disposed between the upper press felt 40 and the lower press felt 42. The sheet of wet of stock, which is sandwiched between the two felts, advances toward a press nip that is created by press rolls 48 and 50 where compression forces water from the wet stock and into the felts. Papermaking machine can have multiple press sections depending on the machine configuration. Upon exiting the wet-press step, the partially de-watered and consolidated sheet is transferred onto the first dryer felt 44 which carries and supports the sheet as it passes over dryer cylinders 52 and 54 where some residual water is removed by evaporation. The sheet is then transferred onto the second dryer felt 58 which is heated by dryer cylinder 56. Only one dryer cylinder is shown whereas a commercial papermaking machine typically has thirty to sixty, depending on the paper machine configuration. At this stage in the process, the relatively thin sheet dried paper product 60 is available for further papermaking processing, such as coating and calendaring, where the moisture content is reduced.

Forming wire 30 is washed and repaired offline whereas press and dryer felts can be cleaned and washed, wherein the process is generally referred as conditioning, using chemicals and/or water either online or offline. For example, as shown in FIG. 2, upper press felt 40 is equipped with sensor 70 which measures characteristics of the fabric such as moisture level, porosity of the clothing materials and the like. A spray device 72 directs cleaning fluid onto the fabric as necessary and vacuum device 74 removes the cleaning fluid. Lower press felt 42 is similarly conditioned with sensor 82, spray device 84 and vacuum device 86 and dryer felt 44 is equipped with sensor 76, spray device 78 and vacuum device 80. The quality of machine clothing is maintained in order to produce acceptable paper and paperboard products. Lighter basis weight paper products are preferably made when the felt is new or just cleaned offline whereas the highest basis weight products are produced later when the felt is less porous.

The operating parameters of the papermaking machine are tuned to produce paper products having specific characteristics such as paper grade. With the present invention, empirical operating data of the papermaking machine collected during actual production can be employed to develop a mathematical model to predict the useful life of the wire and press and dryer felts. The collected operating data forms a database that correlates actual useful lives of clothing to machine operating parameters. In this fashion, for any papermaking machine that is available for production, the expected remaining useful life the wire and felts can be calculated based on its operation history.

Operating parameters that are particularly suited for predicting useful clothing lives include, but are not limited to, press felt Uhle box vacuum, suction roll vacuum, clothing thickness, felt water permeability, felt air permeability, hardness of felt or wire, dryer section steam demand, wire speed, and MD and CD physical characteristic profiles of the felts. Felt air permeability measures the air flow rate through the felt while the felt is stationary or as the machine is operating. Felt water permeability measures the flow rate of water that is injected into the stationary or moving felt. Other attributes which can be employed with the collected operating parameters to predict the remaining clothing life are historical clothing data which consist of data of how the clothing was used previously. Exemplary historical clothing data include, for instance, clothing mounting date, average life of clothing, length of operation of clothing on machine, online conditioning regiment for clothing, offline conditioning schedule for clothing, type of clothing such as single or multi-layer fabrics and different grades and basis weights of paper products manufactured on a particular papermaking machine.

Typical attributes of an order for paper products are customer, a due date (ship date), production specifications (grade, basis weight), physical specifications (width, product roll diameter range or sheet length, core diameter and customer specific requirements) and order quantity with given tolerances. When an order has more than one product, in terms of physical and production specifications, the individual product is referred to as an order item. A typical large paper manufacturing enterprise has a number of paper mills in various locations, with each mill having one or more papermaking machines. A feature of the present invention order allocation process pertains to production planning and scheduling to decide where each order item will be produced. Orders can also include forecasted order items, which are standard orders that are based on forecasted quantities based on historical data.

Each papermaking machine can be tuned to produce different products at different production rates. The production costs, which comprise the major portion of the selling price, are usually different for different papermaking machines for the same product. To the reduce transportation cost, which is another major component to the selling price, it is preferable to produce order items in mills close to the order's final destination. Order allocation in the prior art that focused on production, fixed grade change time (the cost associated with change over production time loss and does not consider clothing performance), inventory and transportation costs without taking clothing performance into account often resulted in schedules with poor performance in on-time delivery, setup changeovers and trimming. The setup changeover cost, trim loss and on time delivery depend on how the production runs get form on individual machines.

A continuous papermaking machine makes one product at a time. A production run or time slot is the period of time over which the machine produces the same product. It should be noted that production runs or time slots can be of different time widths depending upon the quantities of the order items being processed simultaneously. When the product on a machine is changed, the machine can continue to operate but the paper produced is usually of lower quality for an initial period of time. This "transition time" or "grade change time" depends on the machine and on the products being manufactured before and after the changeover.

Planning and scheduling begins with obtaining customer orders to be delivered within a specific time frame and equipment availability. Customer orders can also include forecasted or anticipated future orders. Planning entails collecting standard or conventional order planning parameters which includes for example: (1) order details such as customer name, consignee, mode of transportation, stock or making order, order quantity, (2) order type such as roll, sheet, and cartons, (3) production route such as papermaking machine, winder, rewinder, sheeter, warehouse, and combination of different paper making, converting and wrapping machines (4) grade specification details such as writing and printing, paperboard, packaging, cartons, kraft, copier, newsprint, laser paper, tissue, and specialty papers (5) ship promise date and delivery date, (6) papermaking machine availability and downtime, and (7) different types of costs such as manufacturing, trimming, warehousing, opportunity lost, and freight cost. Next, for each papermaking machine that is available for production, it is necessary to measure and collect for each machine the above-mentioned operating parameters and ascertain the historical clothing data.

Figure 3:
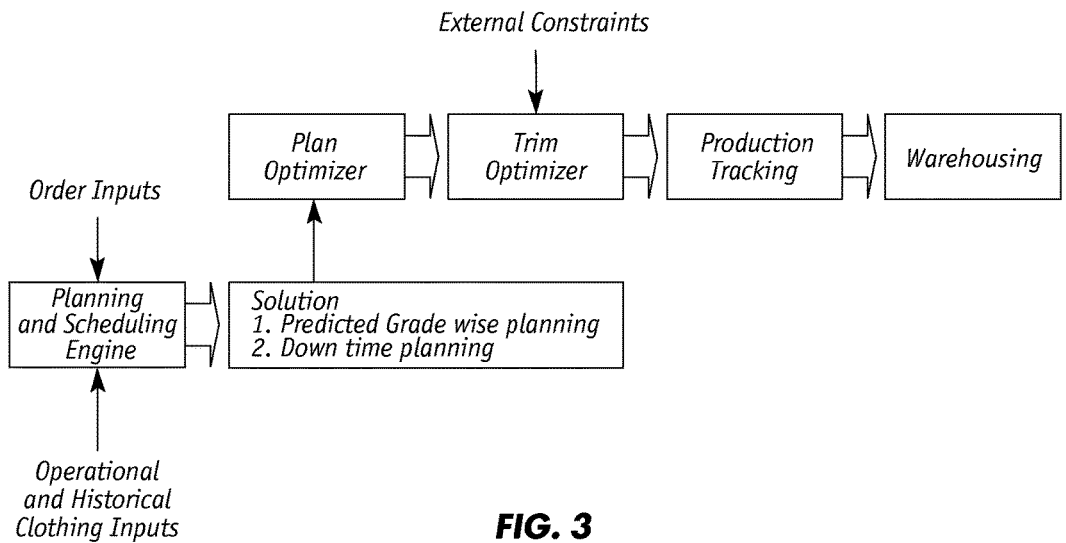
FIG. 3 is a production model that integrates clothing performance in customer order planning scheduling.

FIG. 3 shows the production process where the clothing performance of individual papermaking machines is considered in the planning stages so that orders for paper products are assigned to selected papermaking machines such that upon executed of the orders, the products are delivered on time and with minimal costs. The standard order planning parameters, operating parameters and ascertained the historical clothing data are inputs into a Planning and Scheduling Engine which employs a mathematical model that analyzes the data and generates solutions that identify the manufacturing time associated with each ordered item. For example, a plurality of time blocks is generated with each time block corresponding to a paper product having specific grade, quantity, and delivery time. Any planning tool generates a production plan that identifies the papermaking machines, order execution dates, type, size and quantity of paper products required. The trim planner fine tunes the production plan with external constraints that include, but are not limited to, the following parameters: (1) papermaking machine parameters such as throughput, machine configuration and specifications, (2) optional and urgent (hot) orders, (3) stock orders, (4) quantity tolerances, and (5) future orders. Production tracking monitors and controls the production process. The produced products are warehoused and thereafter shipped.

The foregoing has described the principles, preferred embodiments and modes of operation of the present invention. However, the invention should not be construed as being limited to the particular embodiments discussed. Thus, the above-described embodiments should be considered as illustrative rather than restrictive, and it should be appreciated that variations may be made in those embodiments by workers skilled in the art without departing from the scope of the present invention as defined by the following claims.

What is claimed is:

1. A method of planning the manufacturing of paper products with a plurality of papermaking machines wherein for each of the plurality of papermaking machines a sheet of wet stock comprising fibers is initially formed on a water permeable moving wire of a forming section of a de-watering machine and thereafter a sheet of partially de-watered web stock is transferred to a press section of the de-watering machine, wherein the press section comprises a continuously circulating press felt, wherein said method comprises:

(a) operating the plurality of papermaking machines to produce paper products including online or offline cleaning of at least one of the wire or felt;

(b) monitoring the condition of clothing on each of the plurality of papermaking machines and estimating the useful life of the clothing for each papermaking machine based on empirical operating data and historical clothing data;

(c) establishing a library containing the useful clothing life of the clothing for each of the papermaking machines for supported grades and basis weights;

(d) obtaining customer orders for paper products including (i) collecting one or more customer order parameters that is selected from the group consisting of paper product specifications, transportation modes, delivery dates, and combinations thereof and (ii) classifying the customer orders according to one or more product criteria that is selected from the group consisting of grade of paper product, paper product quantity, delivery date, and combinations thereof to create a tabulation of discrete production orders;

(e) identifying the warehousing requirements for the paper products;

(f) identifying the delivery date for each of the discrete production orders; and (g) assigning one or more of the plurality of papermaking machines to execute the discrete production orders with the objective of limiting costs.

2. The method of claim 1 wherein step (b) comprises collecting (i) one or more papermaking machine parameters for each of the plurality of papermaking machines which are selected from the group consisting of press felt Uhle box vacuum, vacuum box, suction roll vacuum, clothing thickness, felt water permeability, felt air permeability, hardness of the felt, hardness of the wire, dryer section steam demand, papermaking machine wire operating speed, machine direction physical characteristic profile, cross direction physical characteristic profile, and combinations thereof, and (ii) one or more historical clothing data for each papermaking machine.

3. The method of claim 2 wherein the historical clothing data for each papermaking machine is selected from the group consisting of clothing mounting date, average life of clothing, length of operation of clothing on papermaking machine, online cleaning regiment for clothing, offline cleaning schedule for clothing, type of clothing, different grades and basis weights of paper products manufactured on a particular papermaking machine and combinations thereof.

4. The method of claim 1 wherein the clothing comprises papermaking machine wires and felts.

5. The method of claim 1 wherein each papermaking machine assigned has a useful clothing life sufficient to permit the papermaking machine to produce the paper product without anticipated breakage of the clothing.

6. The method of claim 1 wherein within discrete production orders of the same grade of paper product, step (g) comprises assigning one or more of the plurality of papermaking machines to produce the paper products in the order of their basis weight such that paper products with the highest basis weight are produced last.

7. The method of claim 1 wherein step (b) comprises estimating degradation of the clothing during production of the paper products.

8. The method of claim 7 wherein step (b) quantifies the degradation of the clothing based on the historical clothing data and current empirical operating data of each papermaking machine.

9. A method of efficient planning of operating a papermaking machine with enhanced clothing life wherein a sheet of wet stock comprising fibers is initially formed on a water permeable moving wire of a forming section of a de-watering machine and thereafter a sheet of partially de-watered web stock is transferred to a press section of the de-watering machine, wherein the press section comprises at least one continuously circulating press felt, the method comprising:
(a) operating the machine to produce a selected quantity of first grade paper product including online or offline cleaning of at least one of the wire or felt;
(b) monitoring the conditions of the wire and felt and generating empirical operating data thereof, wherein the empirical operating data forms a database which correlates actual useful lives of the wire and felt to papermaking machine operating parameters in producing paper products;
(c) establishing a library containing the useful lives of the wire and felt for the machine for supported grades and basis weights;
(d) collecting historical clothing data for the papermaking machine and using the database and historical clothing data to calculate the remaining useful lives of the wire and felt with respect to producing a subsequent quantity of subsequent grade of paper product under selected papermaking machine operating parameters, wherein the subsequent grade of paper produced could be the same as the grade of previously made paper product;
(e) operating the papermaking machine under the selected papermaking machine operating parameters to produce a selected subsequent quantity of subsequent grade of paper product, with the proviso that the papermaking machine is operated under operation conditions so that the selected subsequent quantity of subsequent grade of paper product is produced within the remaining useful life of the wire or of the felt that is calculated in step (d); and
(f) repeating steps (b) through (e) until the useful life of either the wire or felt is reached.

10. The method of claim 9 wherein the machine employed to execute step (a) is chosen from a plurality of prospective papermaking machines on an assessment of the machine's capacity to produce the selected quantity of the first grade paper product without excessive degradation or breakage of either its wire or felt.

11. The method of claim 9 wherein step (b) comprises collecting one or more papermaking machine parameters which are selected from the group consisting of press felt Uhle box vacuum, suction roll vacuum, clothing thickness, felt water permeability, felt air permeability, hardness of the felt, hardness of the wire, dryer section steam demand, papermaking machine wire operating speed, machine direction physical characteristic profile, cross direction physical characteristic profile, and combinations thereof.

12. The method of claim 9 wherein step (f) comprises producing a series of paper products with each subsequent paper product being of at the same or higher basis weight than that of the prior paper product.

13. The method of claim 9 wherein step (f) comprises producing a series of paper products until at least 90% of the anticipated useful life of either the wire or felt is achieved without any breakage of either the wire or felt.

14. The method of claim 9 wherein step (b) comprises estimating degradation of the at least one of the wire or felt during production of the paper product.

15. The method of claim 1 wherein the plurality of papermaking machines comprises papermaking machines that are located at different mills.

16. The method of claim 9 wherein the historical clothing data for the machine is selected from the group consisting of clothing mounting date, average life of clothing, length of operation of clothing on papermaking machine, online cleaning regiment for clothing, offline cleaning schedule for clothing, type of clothing, different grades and basis weights of paper products manufactured on the machine and combinations thereof.

* * * * *